(No Model.) 3 Sheets—Sheet 1.

H. A. TOBEY.
THERMOSTATIC REGULATOR.

No. 549,169. Patented Nov. 5, 1895.

Witnesses.
David C. Walter.
H. P. Doolittle.

Inventor:
Henry A. Tobey
by Wm. H. Doolittle
atty.

(No Model.) 3 Sheets—Sheet 2.
H. A. TOBEY.
THERMOSTATIC REGULATOR.

No. 549,169. Patented Nov. 5, 1895.

Witnesses.
David C. Walter
A. P. Doolittle

Inventor:
Henry A. Tobey
by Wm. H. Doolittle
atty.

(No Model.) 3 Sheets—Sheet 3.

H. A. TOBEY.
THERMOSTATIC REGULATOR.

No. 549,169. Patented Nov. 5, 1895.

Witnesses:
H. P. Doolittle.
Jos. H. Blackwood

Inventor.
Henry A. Tobey,
by Wm. H. Doolittle
Attorney.

UNITED STATES PATENT OFFICE.

HENRY A. TOBEY, OF TOLEDO, OHIO.

THERMOSTATIC REGULATOR.

SPECIFICATION forming part of Letters Patent No. 549,169, dated November 5, 1895.

Application filed June 11, 1894. Serial No. 514,228. (No model.)

*To all whom it may concern:*

Be it known that I, HENRY A. TOBEY, a citizen of the United States of America, residing at Toledo, in the county of Lucas and State of Ohio, have invented certain new and useful Improvements in Thermostatic Regulators, of which the following is a specification.

My invention relates to a thermostatic device to be used to automatically maintain water or other flowing medium at practically a uniform temperature by controlling the supply of heat from any suitable source and also for use in mixing liquids, gases, or vapors of varying temperatures and discharging them at a uniform temperature, in connection with an indicating mechanism for adjusting the device to any required temperature.

Part of the devices constituting my invention are the subject of my application Serial No. 512,898.

My present improvements consist of the adaptation of the thermostatic device to an apparatus for mixing hot and cold water and discharging the mixed water at a uniform temperature regardless of variation in the temperature of either the hot or cold water, providing, of course, that the thermostat is set not to discharge water at a higher temperature than the hot water nor at a lower temperature than the cold water entering. These devices are illustrated in the accompanying drawings, in which—

Figure 1:
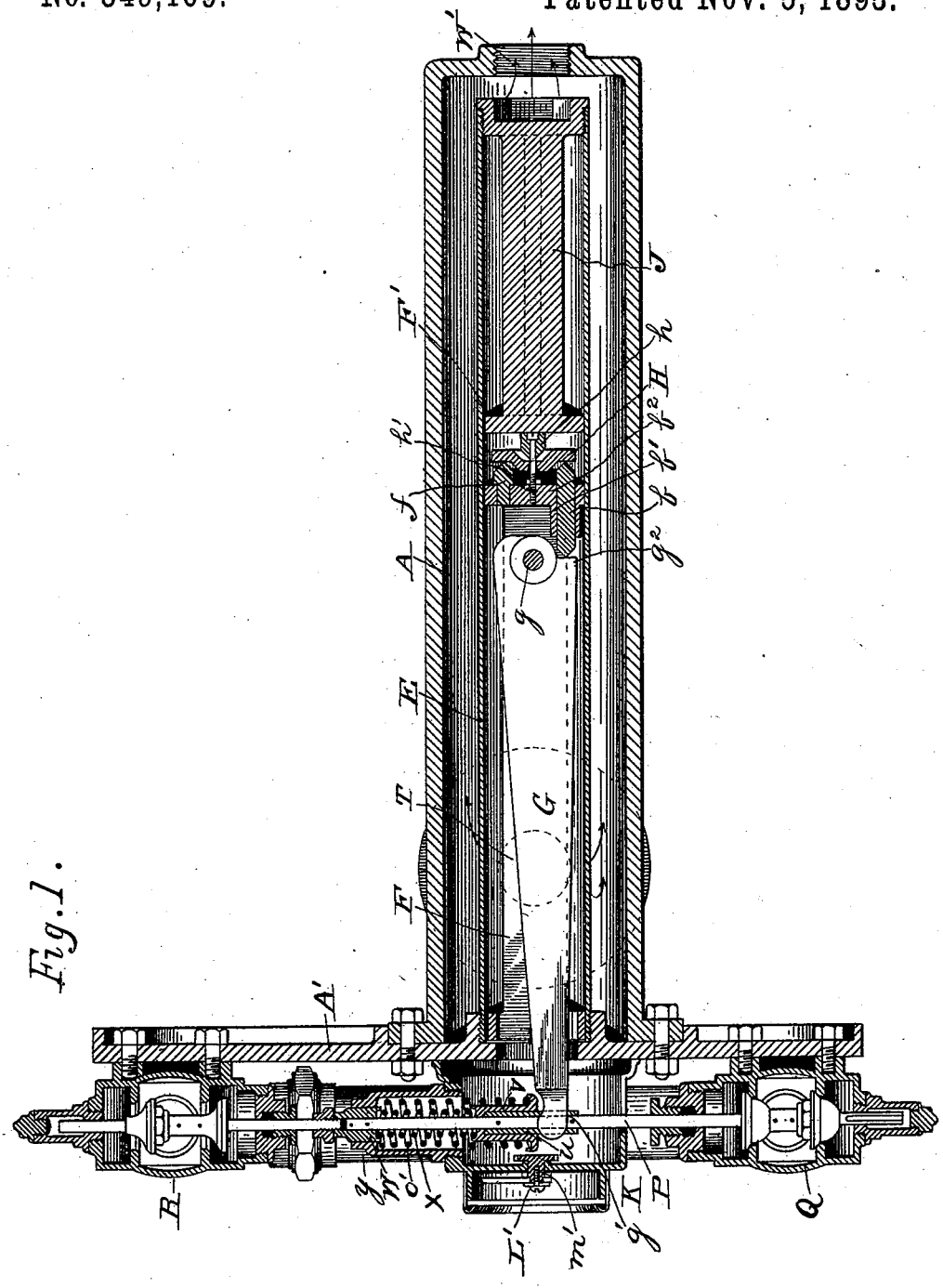
Figure 2:
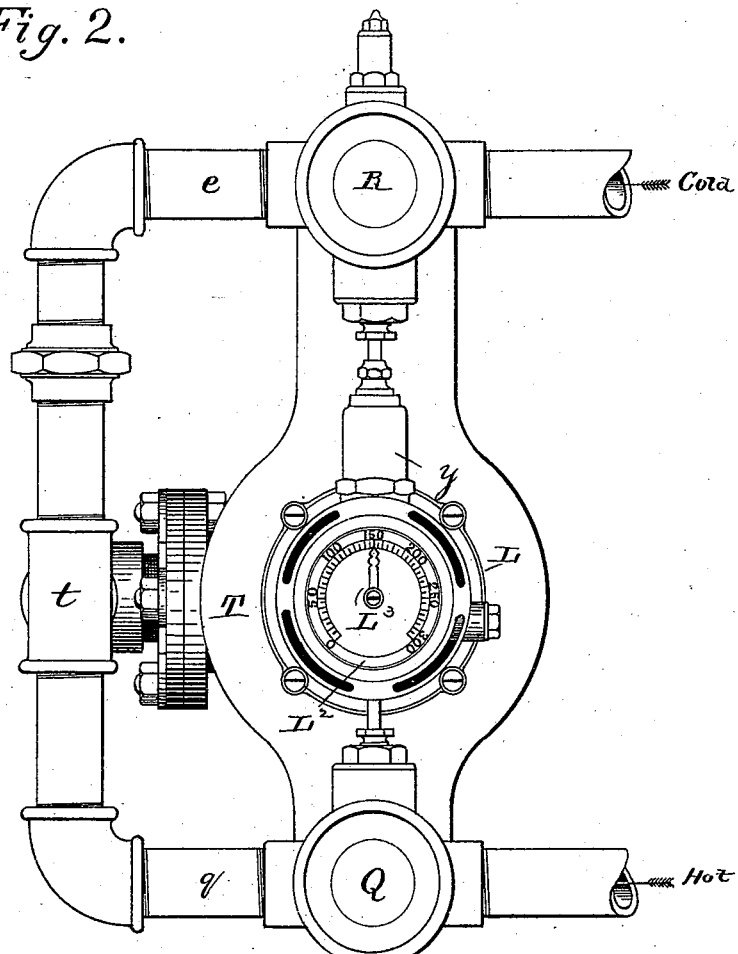
Figure 4:
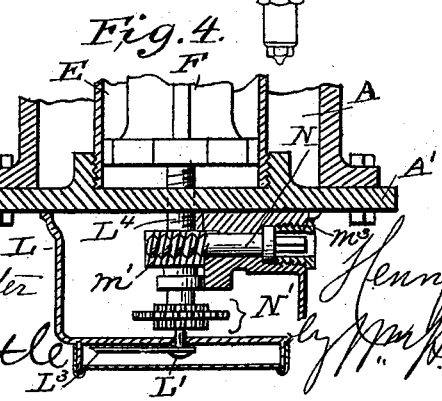
Figure 3:
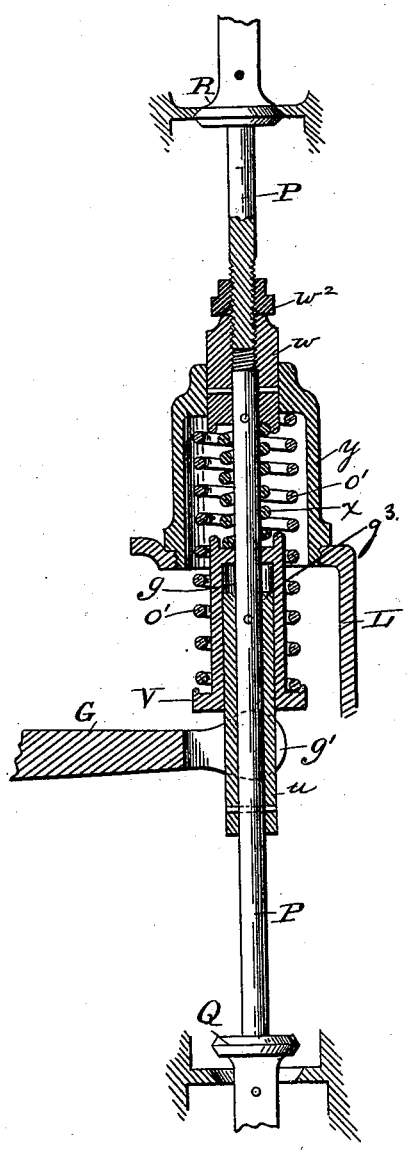

Figure 1 is a vertical section of the thermostatic apparatus and its connection with valves for mixing hot and cold water, and Fig. 2 a face view of the same apparatus in connection with an indicating mechanism. Fig. 3 is an enlarged sectional view of the double-spring arrangement and valve-rod connections for controlling the hot and cold water valves; and Fig. 4, an enlarged detail view, partly in section, of the temperature-regulating device and its immediate connections.

Referring to the drawings, A is the casement or shell in which the thermostatic device is inclosed and which casement is bolted to a casting A'. To the casting A' are also secured the housings for the hot and cold water valves, their stems and controlling-springs, and this casting is also adapted to receive the ends of the hot and cold water supply pipes. The casement A is provided with a screw-threaded outlet $w'$, to which a discharge-pipe may be secured.

The thermostat proper is described and claimed in my application Serial No. 512,898; but its parts are herewith also described in order to better understand its application to the present apparatus.

The expanding member of the thermostat is a tube E, composed of a metal having a high expansive quality, preferably brass, one end of which is screw-threaded and screwed into a threaded recess in the plate A', while its opposite free and inner end is closed by a plug J. Within the tube E is placed an open iron cast frame F, composed of two parallel bars united at their ends. On this frame is hung a lever G, fulcrumed at $g$, which extends between the side bars of the frame out of the expanding tube and heater through a slot in the plate A' and is bifurcated at its outer end $g'$ to embrace a valve-rod P.

The lever G at one side of its fulcrum is provided with shoulder $g^2$. Adapted to bear against this shoulder is a bar $b$, the opposite ends of which are edged to form steelyardbearings. This bar $b$ reciprocates in a slot of an arm $b'$ on one side of a cross-head $b^2$ on the frame F. The opposite end of bar $b$ is adapted to bear against one end of a cross-plate lever H. This is a lever of the second class and is fulcrumed on edged bearing $h$, rigidly fixed to the head of the extended plug J, which fills the lower end of the expanding tube E. The lever H is supported centrally by a screw-rod $h'$, but so as to slide and rock thereon, connecting the plug J and a cross-piece $b^3$ of the frame F. The opposite end of lever H is in contact with another but shorter edged rod $f$, also fixed in cross-head $b^2$. The outer bifurcated end of lever G is connected with rod P, on which is carried hot-water valve Q.

The casting A' has secured to it the casings of two valves R and Q. Both valves are double seated and balanced, and Q admits hot water and R cold water.

On the valve stem or rod P is a sleeve $u$, which is made fast to the rod P. On the sleeve $u$ is placed a cap or thimble V, having a flange at its lower end. On valve-stem P is also another sleeve $w$, inclosed by a housing $y$. Between $w$ and the top of cap V and within the housing $y$ is a strong spiral spring $x$. Extending from the flange at the bottom of the cap V and the top of the fixed housing $y$ is another spiral spring $o'$, which is much weaker than spring $x$ and which is compressed when lever G lifts upward against cap V. The object of spring $x$ is that when cold-water valve R is seated and can go no farther and the temperature of the thermostat gets lower lever G can still rise by overcoming the pressure of said spring $x$, whereas if the connection with valve-stem P were rigid some parts of the device would be overstrained or broken.

The operation of the springs $x$ and $o'$ and their relations to the other elements of the structure (best illustrated in Fig. 3) may be more fully stated as follows: It will be seen that when the lever end $g'$ of the lever G is raised by contraction of the thermostatic tube beyond the distance required to seat the upper valve R the outside cap V is raised from the shoulder $g^3$ of the sleeve $u$, while that valve is forced up against the seat by the inside spring $x$, thus preventing any undue strain on the working parts. As the water in the heater becomes heated the forked end $g'$ of lever G gradually falls and the outer spring $o'$ carries the case V down until it again rests on the upper shoulder of the sleeve $u$. Should the end $g'$ of lever G lower more than is necessary to seat the lower valve Q, it will leave the bottom face of the cap V, the outside spring holding the valve down on its seat, which is necessary, as the valves are perfectly balanced.

It will be seen that the valve-rod P is secured by pins to the sleeve $u$ and is not in contact with the forked end $g'$ of lever G, so that the inside spring must seat the upper valve, while the outer spring seats the lower valve, provided the lever recedes far enough for that purpose. The sleeve $w$ is secured to the lower part of the valve-stem, while the upper part of the valve-stem screws into it. $w^2$ is a lock-nut, and when the valves are adjusted the proper distance apart the nut $w^2$ is turned down.

L represents the indicating and temperature-regulating device, more fully described in my application Serial No. 512,898. This mechanism is partly shown in Fig. 1, but more fully in Fig. 4. Referring to those figures, the regulating device L is secured to the casting A'. On its face L is provided with a graduated plate $L^2$ and a pointer $L^3$. It is also provided with a screw-shaft $L^4$, on which is placed a set of gears N'. The inner end of screw $L^4$ bears against the frame F in the tube E, and on which the lever G is fulcrumed. At right angles to the shaft $L^4$ is located a hollow nut $m^3$, holding in position a worm N, which engages a worm-wheel $n$ on the shaft $L^4$, and by which it operates the said shaft and train of gears $m'$. By turning the worm it is obvious that the screw-shaft $L^4$ may be turned inward against the frame F, carrying the lever G, which operation will cause the free bifurcated end of lever G, connected with valve-rod P, to rise and open the steam-valve Q. It will then require a greater expansion of the tube E to allow the valve to close, and consequently a higher temperature of the water in the heater. These differences and requirements as to temperature are indicated by the pointer on the graduated plate.

The operation of the device is as follows: Let it be supposed that the expansion-tube E is contracted by the lowering of the temperature of the water. One end of the tube being fixed, the other end would move, imparting its motion through fulcrum $h$ to plate-lever H. One end of lever H being fixed by contact-bearing $f$, twice the amount of the movement of the tube E would be imparted to the opposite end of lever H, which in turn would be transferred by means of rod $b$ to shoulder $g^2$ of lever G, causing the lever to rock on its fulcrum $g$ and raising its free end on valve-rod P against cap V on valve-stem P, overcoming the force of spring $x$ on said rod and lifting the valve Q.

Referring to Fig. 2, the cold water passes through valve R and pipe $e$ to $t$, where it meets and mixes with the hot water that passes through valve Q and pipe $q$ and enters the shell or casement A at T, thence around the thermostatic device to opening or outlet W', where it is discharged. Changes in the temperature of the water in casement A cause the expansion-tube E to expand or contract, or, in other words, to lengthen or shorten, which movement is transferred, as before described, to lever G of the thermostatic device. When this end of lever G moves upward, valve Q is opened, admitting hot water, and valve R is closed, shutting off cold water. When the movement of the lever G is reversed, the opposite action takes place, the hot water being shut off and the cold water turned on.

Having thus described my device, what I claim is—

1. In combination with a thermostatic device provided with an expanding body and a lever pivoted within said expanding body, of an outside valve rod to which said lever is connected, said valve rod provided at one end with a valve to admit cold water and at its opposite end with a valve to admit hot water, two springs on said valve rod, to vary and relieve the pressure on said rod against the action of said lever, substantially as described.

2. The combination with a thermostatic device provided with an expanding tube, closed at one end, and an actuating lever pivoted within said tube, of a casing inclosing said tube and lever, said casing adapted at one end to be secured to an outlet pipe, a casting to which the opposite end of said casing is secured, a valve stem carrying at each end a valve, and to which stem said lever is connected, a temperature regulator and indicator through the casing of which said stem passes, a spring on said stem controlling the action of said valve against the action of said lever, the casing of said indicator and the housings of said valves and valve stem secured to the casting to which the thermostat is secured, substantially as described.

In testimony whereof I affix my signature in presence of two witnesses.

HENRY A. TOBEY.

Witnesses:
E. A. HAMWAY,
F. E. SNELL.